United States Patent Office 3,321,471
Patented May 23, 1967

3,321,471
ORGANIC COMPOUNDS AND PROCESSES
Leo A. Paquette, Columbus, Ohio, assignor to The Upjohn Company, Kalamazoo, Mich., a corporation of Delaware
No Drawing. Filed May 6, 1964, Ser. No. 365,514
6 Claims. (Cl. 260—243)

This invention relates to novel compounds and to processes for their preparation; particularly to novel 10-(aminooxyacetal)phenothiazines and acid addition salts thereof, and to 10-(isopropylideneaminooxyacetyl)phenothiazines, and to new methods for their preparation.

The novel 10-(aminooxyacetyl)phenothiazines are represented by the formula

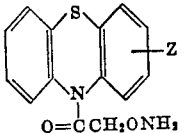

O=CCH₂ONH₂ (I)

wherein Z is selected from the group consisting of hydrogen, halogen, trifluoromethyl, alkylthio, alkanoyl, alkyl, and alkoxy.

Examples of halogen are fluorine, chlorine, bromine, and iodine. Examples of alkyl in the alkylthio, alkanoyl, alkyl, and alkoxy substituents are methyl, ethyl, propyl, butyl, pentyl, and isomeric forms thereof.

The novel isopropylideneaminooxyacetyl compounds, which are intermediates for the preparation of the aminooxyacetyl compounds (I) delineated in the preceding formula, are represented by the formula

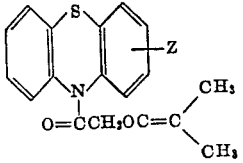

(II)

wherein Z has the same meaning as above.

The novel compounds of Formula I exist in their non-protonated (free base) or protonated forms depending on the pH of their environments. They form stable protonates (acid addition salts) on neutralization with acids, for example, hydrochloric, hydrobromic, sulfuric, phosphoric, nitric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine or iodine, are removed from vicinal carbon atoms.

The thiocyanic acid addition salts of compounds of Formula I, i.e., the 10-(aminooxyacetyl)phenothiazines, when condensed with formaldehyde, form resinous materials useful as pickling inhibitors according to U.S. Patents 2,425,320 and 2,606,155. The fluosilicic acid addition salts of the compounds of Formula I are useful as mothproofing agents according to U.S. Patents 1,915,334 and 2,075,359.

The novel 10-(aminooxyacetyl)phenothiazines (I) of the invention can be prepared (in the form of their acid addition salts) by the acid hydrolysis of the corresponding 10-(isopropylideneaminooxyacetyl)phenothiazines (II). The hydrolysis advantageously is effected with hydrochloric acid, although other acids, particularly other mineral acids, e.g., hydrobromic or sulfuric acids can be used. Preferably the molar ratio of the acid to the compound of Formula II ranges from about 1:1 to about 2:1; the temperature at which the hydrolysis is carried out ranges from about 75° C. to about 110° C.; and the reaction time ranges from about 10 minutes to about 30 minutes. Substantially higher molar ratios of acid to compound (II), or higher reaction temperatures, or longer reaction times, or combinations thereof, may lead to side reaction, e.g., hydrolysis of the amide linkage.

The products (I) are recovered from the reaction mixture by conventional procedures; for example, by evaporation to dryness, recrystallization, and the like. The resulting acid addition salts of Formula I can be converted to their free bases by treatment with an alkali metal hydroxide, e.g., aqueous sodium or potassium hydroxide, and the liberated free bases can be converted to other acid addition salts by neutralization with an acid, for example, any of the acids given above. Acid addition salts can also be formed by metathesis.

The novel 10-(isopropylideneminooxyacetyl)phenothiazines (II) of the invention are prepared by the reaction of a compound of the formula

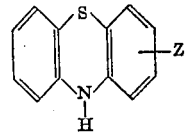

wherein Z has the same meaning as above, with isopropylideneaminooxyacetyl chloride (prepared in the manner disclosed in J. Med. Pharm. Chem. 5, 464) having the formula

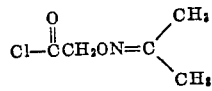

The reaction can advantageously be carried out at elevated temperatures, e.g., by heating the reactants in an inert solvent such as benzene, toluene, xylene, and the like, preferably between about 50° C. and about 140° C. A heating period of about two to ten hours is sufficient to effect substantial completion of the reaction. The products (II) are recovered from the reaction mixture by conventional procedures; for example, by evaporation to dryness followed by treatment with an inert solvent (e.g., ethanol), recrystallization, and the like.

The novel compounds of Formula II, and those of Formula I in their free base form and in the form of their acid addition salts with pharmacologically acceptable acids, for example, hydrochloric, hydrobromic, sulfuric, phosphoric, nitric, acetic, benzoic, salicylic, glycolic, succinic, nicotinic, tartaric, maleic, malic, lactic, methanesulfonic, and cyclohexanesulfamic acids and the like, exhibit pharmacological activity. The compounds of Formula I are potent inhibitors of the enzyme 5-hydroxytryptophan decarboxylase and produce central nervous system depression. They can be used for producing sedation in mammals and animals, e.g., mice, rats and birds. The compounds of Formula II possess central nervous system depressing and anti-inflammatory properties; they are useful for producing sedation and in the treatment of inflammatory conditions of the skin, eyes, and respiratory tract in mammals and animals, e.g., mice, rats and birds.

The novel compounds of Formula I can be used in the preparation of the corresponding anorexigenic guanidines; by reacting the former with 2-methyl-2-thiopseudourea sulfate, or with cyanamide. For example, treating 10-(aminooxyacetyl)phenothiazine with the aforesaid reagents by the methods disclosed in J. Chem. Soc., 963 (1947), for the preparation of 1-alkoxyguanidines, yields 10-(guanidinooxyacetyl)phenothiazine. The fluosilicic acid addition salt of the thus produced compound is useful as a mothproofing agent according to U.S. Patent 2,205,789. 10-(guanidinooxyacetyl)phenothiazine is also useful as an acid acceptor in neutralizing undesirable acidity or in absorbing an acid as it is formed in a chemical reaction as noted above, particularly when an acid acceptor of greater basicity is desired.

The invention can be more fully understood by the following example which embodies the best manner known for carrying it out.

EXAMPLE 1

A. *10-(isopropylideneaminooxyacetyl)phenothiazine(II)*

To a mixture of 10 g. (0.05 mole) of phenothiazine in 50 ml. of benzene (previously dried with sodium) was added, in one portion, a solution of 7.5 g. (0.05 mole) of isopropylideneaminooxyacetyl chloride in 50 ml. of sodium-dried benzene. The solution was refluxed for 2 hours. The solvent was evaporated under reduced pressure and the residue, and oil, was treated with 40 ml. of absolute ethanol and cooled. The pale yellow solid that separated was filtered and dried to yield 14.2 g. (91.1% yield) of product with a melting point of 115 to 116° C. Three recrystallizations of this material from absolute ethanol gave pure 10-(isopropylideneaminooxyacetyl)phenothiazine as colorless platelets, with a melting point of 115 to 116° C.

$\mu_{max}^{mineral\ oil}\ 1695 cm.^{-1}$ (amide carbonyl)

*Analysis.*—Calcd. for $C_{17}H_{16}N_2O_2S$: C, 65.35; H, 5.16; N, 8.97. Found: C, 65.42; H, 5.26; N, 8.62.

Following the procedure of part A but substituting for phenothiazine:

2-chlorophenothiazine,
1-chlorophenothiazine,
3-fluorophenothiazine,
4-bromophenothiazine,
2-trifluoromethylphenothiazine,
2-methylthiophenothiazine,
2-ethylthiophenothaizine,
1-butylthiophenothiazine,
2-acetylphenothiazine,
2-valerylphenothiazine,
4-propionylphenothiazine,
2-methylphenothiazine,
2-t-butylphenothiazine,
2-isopropylphenothiazine,
2-pentylphenothiazine,
4-ethylphenothiazine,
2-methoxyphenothiazine,
1-ethoxyphenothiazine,
3-propoxyphenothiazine, and
4-isopentyloxyphenothiazine, yields, respectively, 2-chloro-10-(isopropylideneaminooxyacetyl) phenothiazine,
1-chloro-10-(isopropylideneaminooxyacetyl) phenothiazine,
3-fluoro-10-(isopropylideneaminooxyacetyl) phenothiazine,
4-bromo-10-(isopropylideneaminooxyacetyl) phenothiazine,
2-trifluoromethyl-10-(isopropylideneaminooxyacetyl) phenothiazine,
2-methylthio-10-(isopropylideneaminooxyacetyl) phenothiazine,
2-ethylthio-10-(isopropylideneaminooxyacetyl) phenothiazine,
1-butylthio-10-(isopropylideneaminooxyacetyl) phenothiazine,
2-acetyl-10-(isopropylideneaminooxyacetyl) phenothiazine,
2-valeryl-10-(isopropylideneaminooxyacetyl) phenothiazine,
4-propionyl-10-(isopropylideneaminooxyacetyl) phenothiazine,
2-methyl-10-(isopropylideneaminooxyacetyl) phenothiazine,
2-t-butyl-10-(isopropylideneaminooxyacetyl) phenothiazine,
2-isopropyl-10-(isopropylideneaminooxyacetyl) phenothiazine,
2-pentyl-10-(isopropylideneaminooxyacetyl) phenothiazine,
4-ethyl-10-(isopropylideneaminooxyacetyl) phenothiazine,
2-methoxy-10-(isopropylideneaminooxyacetyl) phenothiazine,
1-ethoxy-10-(isopropylideneaminooxyacetyl) phenothiazine,
3-propoxy-10-(isopropylideneaminooxyacetyl) phenothiazine, and
4-isopentyloxy-10-(isopropylideneaminooxyacetyl) phenothiazine.

B. *10-(aminooxyacetyl)phenothiazine hydrochloride(1)*

A mixture of 3.1 g. (0.01 mole) of 10-isopropylideneaminooxyacetyl)phenothiazine from part A, 20 ml. of water, 25 ml. of acetic acid, and 1 ml. of concentrated hydrochloric acid (containing 0.012 mole of hydrogen chloride) was heated on a steam bath for 15 minutes, then evaporated to dryness under reduced pressure. Recrystallization of the solid residue from 95% ethanol-anhydrous ether gave 1.1 g. (35% yield) of pure 10-(aminooxyacetyl)phenothiazine hydrochloride which decomposed at 198° C.

*Analysis.*—Calcd. for $C_{14}H_{12}N_2O_2S \cdot HCl$: C, 54.45; H, 4.24; N, 9.07; Cl, 11.48; S, 10.38. Found: C, 54.40; H, 4.18; N, 8.88; Cl, 11.64; S, 10.73.

On neutralization with sodium hydroxide or potassium hydroxide the free base form, 10-(aminooxyacetyl)phenothiazine, is obtained.

Following the procedure of part B, but substituting for hydrochloric acid another acid, e.g., hydrobromic or sulfuric acid, gives the corresponding acid addition salt, i.e., the hydrobromide or sulfate, of 10-(aminooxyacetyl) phenothiazine.

Following the procedure of part B, but substituting for 10-(isopropylideneaminooxyacetyl) phenothiazine the following compounds:

2-chloro-10-(isopropylideneaminooxyacetyl) phenothiazine,
1-chloro-10-(isopropylideneaminooxyacetyl) phenothiazine,
3-fluoro-10-(isopropylideneaminooxyacetyl) phenothiazine,
4-bromo-10-(isopropylideneaminooxyacetyl) phenothiazine,
2-trifluoromethyl-10-(isopropylideneaminooxyacetyl) phenothiazine,
2-methylthio-10-(isopropylideneaminooxyacetyl) phenothiazine,
2-ethylthio-10-(isopropylideneaminooxyacetyl) phenothiazine,
1-butylthio-10-(isopropylideneaminooxyacetyl) phenothiazine,
2-acetyl-10-(isopropylideneaminooxyacetyl) phenothiazine,
2-valeryl-10-(isopropylideneaminooxyacetyl) phenothiazine,
4-propionyl-10-(isopropylideneaminooxyacetyl) phenathiazine,
2-methyl-10-(isopropylideneaminooxyacetyl) phenothiazine,
2-t-butyl-10-(isopropylideneaminooxyacetyl) phenothiazine,
2-isopropyl-10-(isopropylideneaminooxyacetyl) phenothiazine, 2-pentyl-10-(isopropylideneaminooxyacetyl)
phenothiazine,
4-ethyl-10-(isopropylideneaminooxyacetyl)
phenothiazine,
2-methoxy-10-(isopropylideneaminooxyacetyl)
phenothiazine,
1-ethoxy-10-(isopropylideneaminooxyacetyl)
phenothiazine,
3-propoxy-10-(isopropylideneaminooxyacetyl)
phenothiazine, and
4-isopentyloxy-10-(isopropylideneaminooxyacetyl)
phenothiazine, yields, respectively,
2-chloro-10-(aminooxyacetyl)phenothiazine hydrochloride,
1-chloro-10-(aminooxyacetyl)phenothiazine hydrochloride,
3-fluoro-10-(aminooxyacetyl)phenothiazine hydrochloride,
4-bromo-10-(aminooxyacetyl)phenothiazine hydrochloride,
2-trifluoromethyl-10-(aminooxyacetyl)phenothiazine,
2-methylthio-10-(aminooxyacetyl)phenothiazine,
2-ethylthio-10-(aminooxyacetyl)phenothiazine,
1-butylthio-10-(aminooxyacetyl)phenothiazine,
2-acetyl-10-(aminooxyacetyl)phenothiazine,
2-valeryl-10-(aminooxyacetyl)phenothiazine,
4-propionyl-10-(aminooxyacetyl)phenothiazine,
2-methyl-10-(aminooxyacetyl)phenothiazine,
2-t-butyl-10-(aminooxyacetyl)phenothiazine,
2-isopropyl-10-(aminooxyacetyl)phenothiazine,
2-pentyl-10-(aminooxyacetyl)phenothiazine,
4-ethyl-10-(aminooxyacetyl)phenothiazine,
2-methoxy-10-(aminooxyacetyl)phenothiazine,
1-ethoxy-10-(aminooxyacetyl)phenothiazine,
3-propoxy-10-(aminooxyacetyl)phenothiazine, and
4-isopentyloxy-10-(aminooxyacetyl)phenothiazine.

I claim:
1. A compound having the formula:

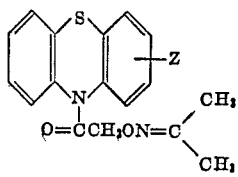

wherein Z is selected from the group consisting of hydrogen, halogen, trifluoromehyl, alkylthio wherein the alkyl group contains from 1 through 5 carbon atoms, alkanoyl wherein the alkyl group contains from 1 through 5 carbon atoms, alkyl of from 1 through 5 carbon atoms, and alkoxy wherein the alkyl group contains from 1 through 5 carbon atoms.

2. 10-(isopropylideneaminooxyacetyl)phenothiazine.

3. A compound selected from the group consisting of (1) a 10-(aminooxyacetyl)phenothiazine of the formula:

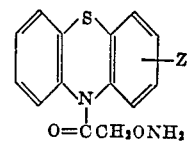

wherein Z is selected from the group consisting of hydrogen, halogen, trifluoromethyl, alkylthio wherein the alkyl group contains from 1 through 5 carbon atoms, alkanoyl wherein the alkyl group contains from 1 through 5 carbon atoms, alkyl of from 1 through 5 carbon atoms, and alkoxy wherein the alkyl group contains from 1 through 5 carbon atoms, and (2) an acid addition salt thereof.

4. 10-(aminooxyacetyl)phenothiazine.

5. An acid adition salt of 10-(aminooxyacetyl)phenothiazine.

6. 10-(aminooxyacetyl)phenothiazine hydrochloride.

References Cited by the Examiner
UNITED STATES PATENTS
3,074,939  1/1963  Davis _____ 260—243

OTHER REFERENCES
Frank et al., Monatsch. Chem., vol. 92, pages 725–39 (1961).

WALTER A. MODANCE, *Primary Examiner.*
H. I. MOATZ, *Assistant Examiner.*